United States Patent [19]

Callahan

[11] 3,997,785
[45] Dec. 14, 1976

[54] INSECT ANTENNA VIBRATING FREQUENCY MODULATOR AND RESONATING MASERLIKE IR EMITTER

[75] Inventor: Philip S. Callahan, Gainesville, Fla.

[73] Assignee: The United States of America as represented by the Secretary of Agriculture, Washington, D.C.

[22] Filed: Sept. 24, 1975

[21] Appl. No.: 616,212

[52] U.S. Cl. .............................. 250/338; 250/341
[51] Int. Cl.[2] .......................................... G01J 1/00
[58] Field of Search ........................... 250/341, 338

[56] References Cited
UNITED STATES PATENTS 2,534,657   12/1950   Bray ................................ 250/341
2,866,900   12/1958   Busignies et al. .................. 250/341

Primary Examiner—Harold A. Dixon
Attorney, Agent, or Firm—M. Howard Silverstein; David G. McConnell; Salvador J. Cangemi

[57] ABSTRACT

A system or method by which electromagnetic wave energy in the near, intermediate, and far infrared portion of spectrum from insect sex scent attractants and host plant or animal scent attractants is converted into narrow band high intensity maserlike infrared emissions is disclosed. The system or method includes a low frequency oscillator for vibrating a silver or gold coated or aluminum low emissivity reed in a vacuum chamber with a suitable infrared window (1 to 30 $\mu$m). The reed vibrator is prepared with a monomolecular layer of suitable insect sex or host attractant or surrounded by vapors of said attractants and vibrated (modulated) in an infrared source of electromagnetic energy at 1 to 30 $\mu$m and at the antenna vibrating frequency of the insect. The narrow band maserlike emission and harmonies thereof are emitted through the IR window and detected by a spectrometer.

17 Claims, 4 Drawing Figures

INSECT ANTENNA VIBRATING FREQUENCY MODULATOR AND RESONATING MASERLIKE IR EMITTER

PRIOR ART AND BACKGROUND OF INVENTION

It has long been known that insects are attracted to specific molecules of sex attractants. The isolation of sex and host plant attractant molecules has progressed steadily over the past three decades. The electromagnetic dielectric antennae theory of insect sensing by means of resonating pits was put forth by Grant in 1948 (Grant, G. R. M. The Sensory Pits of Insects Considered As Dielectric Waveguides and Resonators to Infrared Rays. Proceedings of the royal Society of Queensland 60 (8): 89–98, 1948). Callahan elaborated on a similar theory in 1965 (Callahan, P. S., Intermediate and Far Infrared (FIR) Electromagnetic Theory of Communication and Sensing in Moths and Its Relationship to the Limiting Biosphere of the Corn Earworm, Annals of the Entomological Society of America 58 (5): 727–745, 1965), (Callahan, P. S., Far Infrared Emission and Detection by Night Flying Moths, Nature 207 (4989:1173, 1965), (Callahan, P. S., A Photoelectric-photographic Analysis of Flight Behavior in the Corn Earworm Moth, Heliothis Zea, and Other Moths, Annals of the Entomological Society of America 58(2): 159–169, 1965) and presented a theoretical model of the insect spine sensilla as dielectric wave guides and or resonators in the 1 to 30 $\mu$m infrared region. He then postulated the emission of narrow band "maserlike" luminescence emissions from sex scents in the intermediate and far IR water vapor windows. Subsequently, he demonstrated with electrophysiological techniques the detection of modulated narrow band electromagnetic energy by an insect antenna. Work continues in the detection of these theorized infrared maserlike emissions in the 2 to 5 $\mu$m, 7 to 14 $\mu$m, and 17 $\mu$m and 26 $\mu$m microwindows. A Fourier analysis spectrometer is used to detect and plot the narrow band maserlike emissions and/or reflections.

The theory, method and apparatus were proved out in the laboratory as shown by FIGS. 1, 2, and 3.

OBJECTIVES

It is the object of this invention to provide a system or method for the attraction of insects. More specifically, it is the object of this invention to provide a system of attracting insects or jamming infrared frequencies from insect scents, using the optimum infrared portion of spectrum from insect sex scent attractants and host plant or animal scent attractants and converting into narrow band high intensity maserlike infrared emissions. Another object of this invention is to emit narrow band maserlike emissions and harmonics through the IR window and detect them by a spectrometer.

It is yet another object of this invention to show that the wave properties of an insect sex or host scent are propagated forward through the 1 to 30 $\mu$m infrared window.

Other objects and advantages of this invention will further become apparent hereinafter.

DESCRIPTION OF THE INVENTION

FIG. 1, is a chart of Spectrum (1) taken from a monomolecular layer of cabbage looper pheromone on a reed vibrated at the maximum and minimum cabbage looper antenna vibrating frequency of 55 and 42 cps, respectively.

FIG. 2, is a chart of Spectrum (2) which is a high intensity emission from a vapor of the attractant of Plecia nearctica (the lovebug). The formaldehyde attractant vapor is vibrated at the lovebug antenna vibratory frequency of 128 cps. Two side bands 20 $cm^{-1}$ on either side of the strong narrow maserlike emission are evident in this spectrum.

Figure 1:
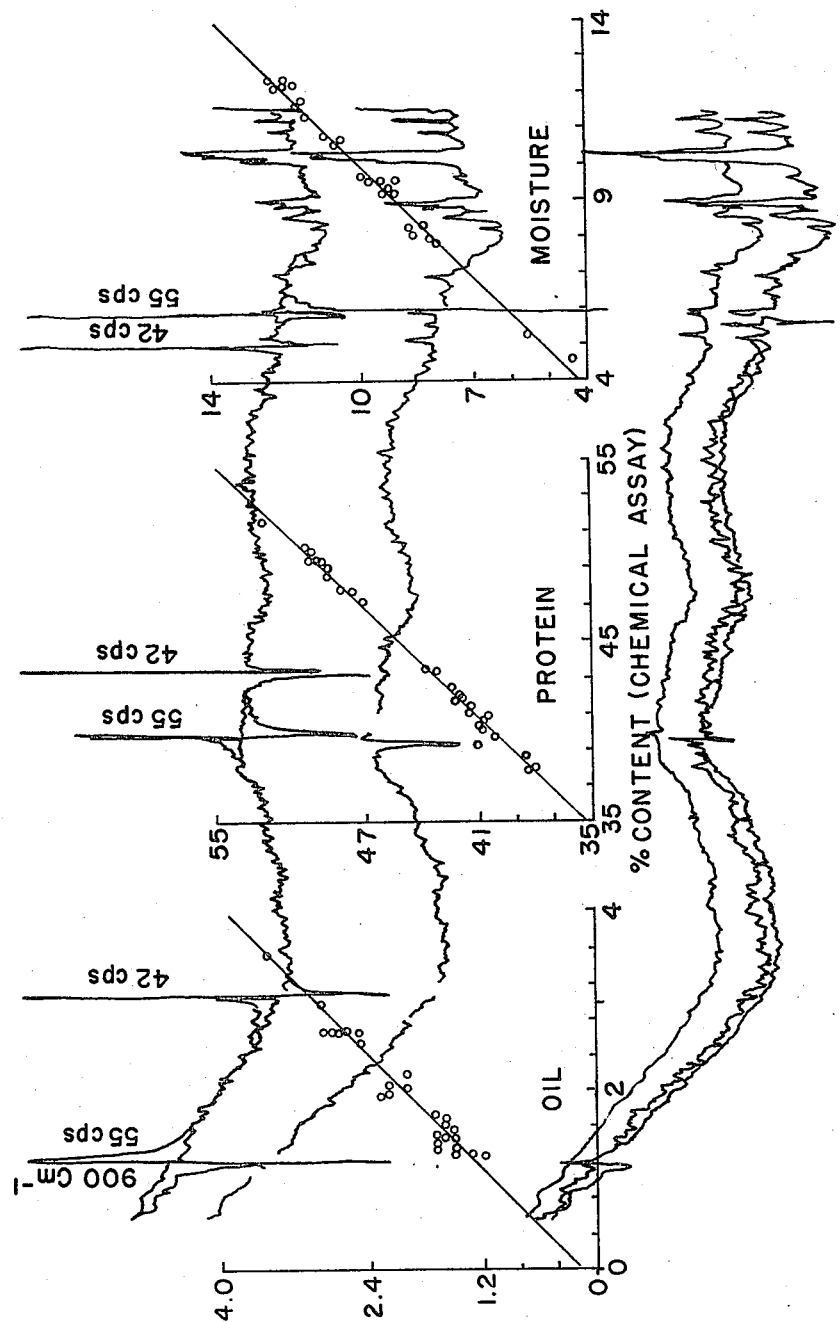
Figure 2:
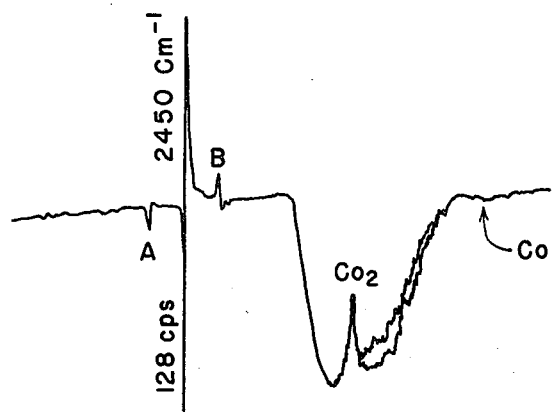
Figure 3:
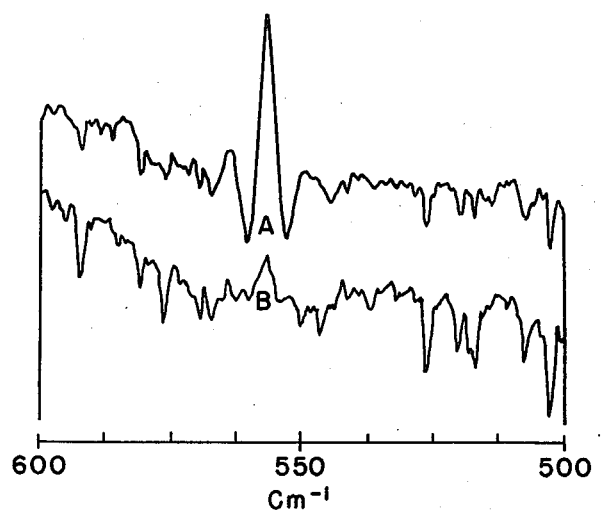
FIG. 3, is a chart of Spectrum (3) which is a low intensity emission from a thick "monomolecular" layer of the cabbage looper pheromone without vibrating (modulating the pheromone (b) and high intensity emission attained with this modulation system (a).
Figure 4:
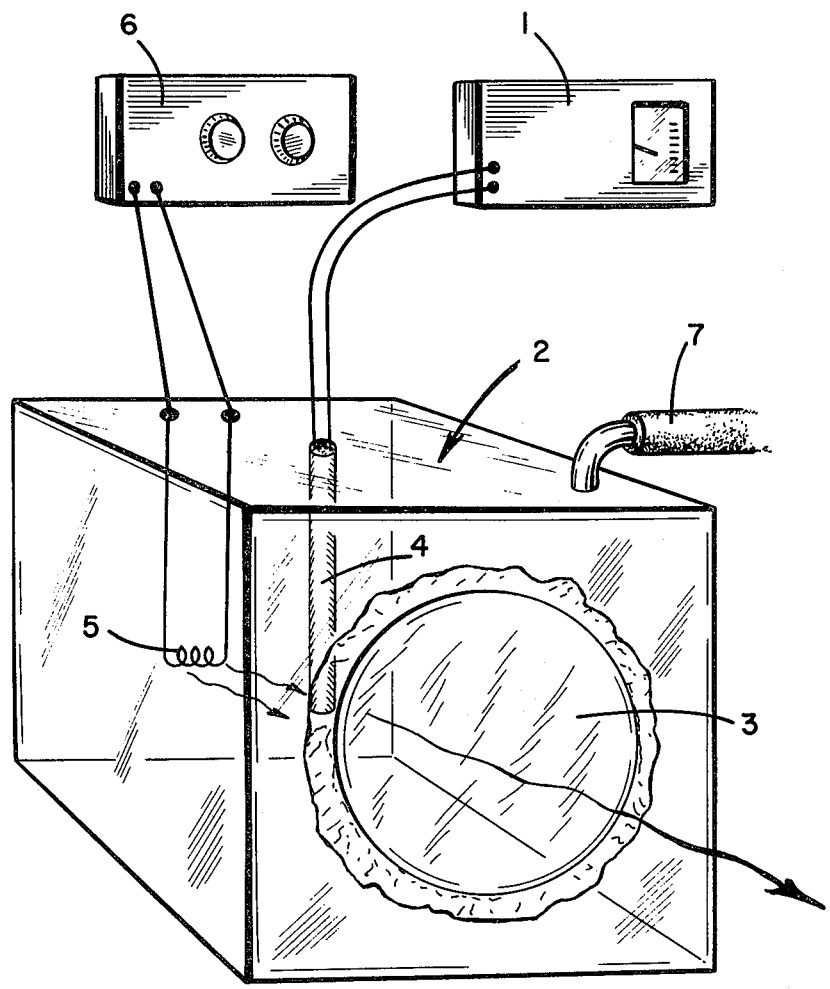
FIG. 4 is a perspective diagram illustrating one embodiment of the invention particularly adapted for stimulating the maserlike IR emissions from insect sex scents (pheromones) or other insect host attractants.

Referring now to FIG. 4, the wave properties of an insect sex or host scent are propagated forward through infrared window 3 which is 1 to 30 $\mu$m. Said window is in the center of a vertical side of cube 2. Cube 2 is one inch cubed, but can be any multiple thereof, and substantially forms a chamber. A bulb of similar diameter can also serve adequately as a chamber. The chamber can be constructed from or blown from glass. A three-quarter inch diameter innfrared window 3 (1 to 30 $\mu$m transmittance) of suitable window material and 2 to 5 $\mu$m thin is sealed in window 3 of cube 2. Cube 2 is evacuated of air to approximately one-half room atmosphere and 50 percent relative humidity by pin of air outlet 7 which is connected to an external evacuation means (not shown). At the center of cube 2 or approximately ½ inch behind the 1–30 $\mu$m IR window, a silver or gold or aluminum reed vibrator 4 is positioned so that it bisects the center or lies along the edge of the 1 to 30 $\mu$m IR window. Reed 4 is one-sixteenth of an inch wide and three-quarters of an inch long or may be a 250 $\mu$m diameter steel pin. Said reed or pin is coated with a monomolecular layer (single layer) of a suitable insect sex attractant (pheromone) or host plant attractant or the chamber is filled with vapors of said attractant. The inside of the chamber and/or bulb is painted with a silver reflective coat. Vibrating reed or pin 4 is connected through the sealed cube and/or bulb to a low frequency oscillator 1 with an adjustable duty cycle of from 5 to 700 cycles per second. Approximately ½-inch behind the reed vibrator and centered in front of the back mirrored surface of the cube and/or bulb, and in the center of the front of the 1 to 30 $\mu$m IR window is a tungsten filament heating element 5. The heating element is wired through the partially evacuated cube or bulb to an adjustable heating unit 6 variable from 300 to 1000 K (absolute) temperature. In place of the variable temperature source 5 and in the same position a 1 $\mu$m emitting diode or other suitable coherent diode (1 to 30 $\mu$m) may be substituted as an energy source. For certain insect sex or host scents the 1 $\mu$m or other IR wavelength emitting diode is preferable.

The infrared energy from the adjustable temperature filament 5 and/or coherent diode is focused by the surrounding silver coated cube and/or bulb onto the monomolecular layer coated or vapor surrounded reed vibrator.

The monomolecular layer and/or vapors of a suitable insect pheromone or host attractant is stimulated to emit by reproducing the vibrating frequency of the antenna of the insect from which the pheromone was obtained and/or the host attractant of the insect. The stimulated IR frequencies and/or harmonics of the frequencies from the monomolecular layer on the reed and or vapors surrounding the reed are directed forward from the surface of the vibrating reed facing the IR window. Each stimulated line of IR radiation emits as a single lobe of radiation and is transmitted in a forward direction through the suitable 1 to 30 $\mu$m infrared window 3.

The frequency and or harmonics thereof may then be detected by a high resolution Fourier analysis interferometer spectrophometer (not shown).

Having thus described my invention, I claim:

1. An apparatus by which electromagnetic wave energy in the near, intermediate and far infrared portion of spectrum from insect sex scent attractants and host plant or animal scent attractants is converted into narrow band high intensity maserlike infrared emissions and detected and measured comprising in combination:

a. a chamber coated on the inside surface with a silver reflective coat, said chamber having b. a 1 to 30 μm infrared window, said window located directly in front of c. a reed or pin vibrator which is located in the center of the chamber bisecting the window, or along the edge of the chamber window, and coated with a monomolecular layer of a suitable insect attractant said vibrating reed or pin connected through the chamber walls to d. a low frequency oscillator with an adjustable duty cycle, e. a tungsten filament heating element located behind the reed vibrator and centered in front of the back mirrored surface of the chamber and in the center of the front of the 1 to 30 μm IR window, said heating element wired to f. a variable heating unit, and g. a means of detecting IR frequency or harmonics as they are stimulated and emitted from said chamber through said IR window.

2. The apparatus as defined in claim 1 wherein the chamber is a cube 1″ × 1″ × 1″ or multiples thereof.

3. The apparatus as defined in claim 1 wherein the chamber is a bulb of similar diameter corresponding to the size of the cube.

4. The apparatus as defined in claim 1 wherein the material the cube and/or bulb chamber is composed is constructed from or blown from glass.

5. The apparatus as defined in claim 1 wherein the vibrating reed is a silver or gold or aluminum reed vibrator 1/16 inch wide and ¾ inch long, or a steel pin of 250 μm diameter.

6. The apparatus as defined in claim 1 wherein the IR window is ¾ inch diameter or (1 to 30 μm) of suitable window material and 2 to 5 μm thin and sealed in one vertical side of the chamber.

7. The apparatus as defined in claim 1 wherein the vibrating reed or pin is coated with a monomolecular layer of host plant attractant.

8. The apparatus as defined in claim 1 wherein the oscillator has an adjustable duty cycle of from 5 to 700 cycles per second.

9. The apparatus as defined in claim 1 wherein the adjustable heating unit is variable from 300 to 1000 K (absolute) temperature.

10. The apparatus as defined in claim 1 wherein the means of detecting the frequency and/or harmonics of the IR radiation emitted is a high resolution Fourier anaysis interferometer spectrophotometer.

11. A method by which electromagnetic wave energy in the near, intermediate, and far infrared portion of spectrum from insect sex scent attractants and host plant or animal scent attractants is converted into narrow band high intensity maserlike infrared emissions comprising:

a. coat a reed vibrator or pin with a monomoleuclar layer of a suitable insect attractant and b. locate said reed vibrator or pin in the center of a cubical chamber which is coated on the inside surface with a silver reflective coat, c. connect said reed vibrator or pin to a low frequency oscillator with an adjustable duty cycle, d. locate a tungsten filament heating element being the reed vibrator or pin and center it in front of the back mirrored surface of the chamber and line it up with the center of or along the edge of e. a (1 to 30 μm) IR window which is located in the center of a vertical wall side of the chamber opposite to the heating element and reed vibrator, said IR window being ¾ inch in diameter or (1 to 30 μm) of suitable window material and (2 to 5 μm) thin and seal into the vertical wall;

f. wire said heating element to a variable heating unit and g. evacuate said chamber to approximately ½ room atmosphere and 50% relative humidity, h. vary said oscillator of step (c) from 5 to 700 cycles per second, i. simultaneously vary said tungsten heating element of step (d) from 300 to 1000 K (absolute) temperature, j. measure with a high resolution Fourier analysis interferometer spectrophotometer of the IR radiation which is emitted and directed through the (1 to 30 μm) IR window.

12. The method of claim 11 wherein the cubical chamber is a bulb of equivalent diameter.

13. The method of claim 11 wherein the vibrating reed is a silver, gold, or aluminum reed or pin and coated with a monomolecular layer of suitable insect attractant or of host plant attractant.

14. An apparatus by which electromagnetic wave energy in the near, intermediate and far infrared portion of spectrum from insect sex scent attractants and host plant or animal scent attractants is converted into narrow band high intensity maserlike infrared emissions and detected and measured comprising in combination:

a. a chamber coated on the inside surface with a silver reflective coat, said chamber having b. a 1 to 30 μm infrared window, said window located directly in front of c. a reed or pin vibrator which is located in the center of the chamber bisecting the window, or along the edge of the chamber window, and said chamber filled with vapor of said insect sex attractant, d. a low frequency oscillator with an adjustable duty cycle, e. a tungsten filament heating element located behind the reed vibrator and centered in front of the back mirrored surface of the chamber and in the center of the front of the 1 to 30 μm IR window, said heating element wired to f. a variable heating unit, and g. a means of detecting IR frequency or harmonics as they are stimulated and emitted from said chamber through said IR window.

15. An apparatus by which electromagnetic wave energy in the near, intermediate and far infrared portion of spectrum from insect sex scent attractants and host plant or animal scent attractants is converted into narrow band high intensity maserlike infrared emissions and detected and measured comprising in combination:
  a. a chamber coated on the inside surface with a silver reflective coat, said chamber having
  b. a 1 to 30 $\mu$m infrared window, said window located directly in front of
  c. a reed or pin vibrator which is located in the center of the chamber bisecting the window, or along the edge of the chamber window, and coated with a monomolecular layer of a suitable insect attractant said vibrating reed or pin connected through the chamber walls to
  d. a low frequency oscillator with an adjustable duty cycle,
  e. a tungsten filament heating element located behind the reed vibrator and centered in front of the back mirrored surface of the chamber in the center of the front of the 1 to 30 $\mu$m IR window, said heating element wired to
  f. a 1 $\mu$m emitting diode, or other suitable diode (1 to 30 $\mu$m),
  g. a means of detecting IR frequency or harmonics as they are stimulated and emitted from said chamber through said IR window.

16. A method by which electromagnetic wave energy in the near, intermediate, and far infrared portion of spectrum from insect sex scent attractants and host plant or animal scent attractants is converted into narrow band high intensity maserlike infrared emissions comprising:
  a. filling as chamber with vaporous insect sex attractants and
  b. locate a reed vibrator or pin in the center of a cubical chamber which is coated on the inside surface with a silver reflective coat,
  c. connect said reed vibrator or pin to a low frequency oscillator with an adjustable duty cycle,
  d. locate a tungsten filament heating element behind the reed vibrator or pin and center it in front of the back mirrored surface of the chamber and line it up with the center of or along the edge of
  e. a (1 to 30 $\mu$m) IR window which is located in the center of a vertical wall side of the chamber opposite to the heating element and reed vibrator, said IR window being ¾ inch in diameter or (1 to 30 $\mu$m) of suitable window material and 2 to 5 $\mu$m) thin and seal into the vertical wall;
  f. wire said heating element to a variable heating unit and
  g. evacuate said chamber to approximately ½ room atmosphere and 50% relative humidity,
  h. vary said oscillator of step (c) from 5 to 700 cycles per second,
  i. simultaneously vary said tungsten heating element of step (d) from 300 to 1000 K (absolute) temperature,
  j. measure with a high resolution Fourier analysis interferometer spectrophotometer of the IR radiation which is emitted and directed through the (1 to 30 $\mu$m) IR window.

17. A method by which electromagnetic wave energy in the near, intermediate, and far infrared portion of spectrum from insect sex scent attractants and host plant or animal scent attractants is converted into narrow band high intensity maserlike infrared emissions comprising:
  a. coat a reed vibrator or pin with a monomolecular layer of a suitable insect attractant and
  b. locate said reed vibrator or pin in the center of a cubical chamber which is coated on the inside surface with a silver reflective coat,
  c. connect said reed vibrator or pin to a low frequency oscillator with an adjustable duty cycle,
  d. locate a tungsten filament heating element behind the reed vibrator or pin and center it in front of the back mirrored surface of the chamber and line it up with the center of or along the edge of
  e. a (1 to 30 $\mu$m) IR window which is located in the center of a vertical wall side of the chamber opposite to the heating element and reed vibrator, said IR window being ¾ inch in diameter or (1 to 30 $\mu$m) of suitable window material and (2 to 5 $\mu$m) thin and seal into the vertical wall;
  f. wire said heating element to a 1 $\mu$m emitting diode or other suitable diode (1 to 30 $\mu$m)
  g. evacuate said chamber to approximately ½ room atmosphere and 50% relative humidity,
  h. vary said oscillator of step (c) from 5 to 700 cycles per second,
  i. simultaneously vary said tungsten heating element of step (d) from 300 to 1000 K (absolute) temperature,
  j. measure with a high resultuion Fourier analysis interferometer spectrophotometer of the IR radiation which is emitted and directed through the (1 to 30 $\mu$m) IR window.

* * * * *